US010530685B2

(12) United States Patent
Dong

(10) Patent No.: US 10,530,685 B2
(45) Date of Patent: Jan. 7, 2020

(54) NAMED DATA ROUTING PROTOCOL FOR LOW-POWER AND LOSSY WIDE-AREA NETWORKS (NRPL)

(71) Applicant: Futurewei Technologies, Inc., Plano, TX (US)

(72) Inventor: Lijun Dong, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/925,246

(22) Filed: Mar. 19, 2018

(65) Prior Publication Data

US 2019/0288939 A1 Sep. 19, 2019

(51) Int. Cl.
*H04L 12/753* (2013.01)
*H04L 12/715* (2013.01)
*H04L 12/761* (2013.01)
*H04L 12/755* (2013.01)

(52) U.S. Cl.
CPC ............ *H04L 45/48* (2013.01); *H04L 45/021* (2013.01); *H04L 45/04* (2013.01); *H04L 45/16* (2013.01)

(58) Field of Classification Search
CPC ....... H04B 3/54; H04L 67/2842; H04L 67/02; H04L 67/1097; H04L 45/123; H04L 12/24; H04L 29/08; H04N 7/18; H04W 8/005; H04W 40/12; H04W 40/26; H04W 84/18; H04W 4/06; H04W 28/02; H04W 12/24; Y02B 90/246; Y04S 20/42
USPC ......................................... 370/230, 328, 351
See application file for complete search history.

(56) References Cited

U.S. PATENT DOCUMENTS

| 8,503,309 | B2 * | 8/2013 | Vasseur ................... | H04L 45/04 370/237 |
| 9,264,349 | B2 * | 2/2016 | Vasseur ................... | H04L 45/26 |
| 9,363,179 | B2 * | 6/2016 | Mosko ..................... | H04L 41/12 |
| 9,444,727 | B2 * | 9/2016 | Vasseur ................... | H04L 45/24 |
| 9,503,359 | B2 * | 11/2016 | Dasgupta ................ | H04L 41/16 |
| 9,525,646 | B2 * | 12/2016 | Janneteau ............... | H04L 45/02 |
| 9,544,018 | B2 * | 1/2017 | Hui ......................... | H04B 3/544 |
| 9,549,363 | B2 * | 1/2017 | Hui ......................... | H04W 40/14 |

(Continued)

OTHER PUBLICATIONS

Parasuram, Aishwarya, et al., "An Analysis of the RPL Routing Standard for Low Power and Lossy Networks," Electrical Engineering and Computer Sciences, University of California at Berkeley, Technical Report No. UCB/EECS-2016-106, May 14, 2016, 98 pages.

(Continued)

*Primary Examiner* — Man U Phan
(74) *Attorney, Agent, or Firm* — Vierra Magen Marcus LLP

(57) ABSTRACT

The disclosure relates to technology distributing messages in a low power and lossy network (LLNs). A downstream message including one or more name prefixes hosted at a source node is forwarded along a nodal route of a routing topology. An upstream message is received from one or more nodes along one or more nodal routes in the routing topology based on a routing entry towards a parent node as learned from the downstream message, and an interest message, including one or more of a request for content or rank, is received from the one or more nodes along the one or more nodal routes having an optimal path, the optimal path determined by routing entries stored in the one or more nodes.

18 Claims, 14 Drawing Sheets

(56) References Cited

U.S. PATENT DOCUMENTS

| | | | | |
|---|---|---|---|---|
| 9,571,422 B2* | 2/2017 | Hui | ......................... | H04L 49/20 |
| 9,736,056 B2* | 8/2017 | Vasseur | ................. | H04L 45/124 |
| 10,097,469 B2* | 10/2018 | Hui | ......................... | H04L 45/48 |
| 10,104,712 B2* | 10/2018 | Hui | ...................... | H04W 40/14 |
| 2018/0145876 A1* | 5/2018 | Palankar | .................. | H04B 3/54 |

OTHER PUBLICATIONS

Hoque, A K M Mahmudul, et al., "NLSR: Named-data Link State Routing Protocol," ICN'13, Aug. 12, 2013, 6 pages.

Amadeo, Marica, et al., "Information-Centric Networking for the Internet of Things: Challenges and Opportunities," IEEE Network, Apr. 2016, 21 pages.

Wang, Lan, et al., "OSPFN: An OSPF Based Routing Protocol for Named Data Networking," NDN, Technical Report NDN-0003, Jul. 25, 2012, 15 pages.

Muscariello, Luca, "Cicn," ACM SIGCOMM ICN, Berlin, Sep. 26, 2017, 5 pages.

Named Data Networking (NDN) Project, Newsletter for Oct. 2017, [https://named-data.net/2017/11/03/named-data-networking-ndn-project-newsletter-october-2017], 9 pages.

Winter, T., et al., "RPL: IPv6 Routing Protocol for Low-Power and Lossy Networks," Internet Engineering Task Force (IETF), Mar. 2012, 157 pages.

Vasseur, JP, et al., "RPL: The IP routing protocol designed for low power and lossy networks," iPSO Alliance, Apr. 2011, 20 pages.

\* cited by examiner

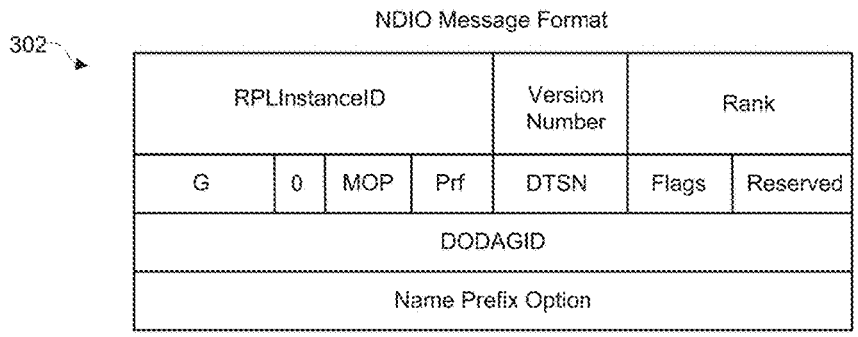

NDIO Message Format

FIG. 3A

NDIO Message Field and Description

| Field | Description |
| --- | --- |
| RPLInstanceID | Not Applicable |
| Version Number | Not Applicable |
| Rank | 16-bit unsigned integer indicating the DODAG rank of the node sending the NDIO message |
| G | The grounded 'G' flag indicates whether the NDIO sender can satisfy the application-defined criteria for the name prefix hosted in the nodes within the DODAG |
| MOP | Not Applicable |
| Prf | Not Applicable |
| DTSN | Not Applicable |
| Flags | The lowest bit is set to 1 to indicate this is a NDIO message that carries name prefixes compared to a regular DIO message |
| Reserverd | The lowest bit is set to 1 to indicate that the NDIO message needs to be propagated until it reaches a lowest rank node with more than one parent |
| DODAGID | If the lowest bit in the Reserved filed is set to 1, this field is used to carry the address of the lowest rank child node with more than one parent |
| Name Prefix Option | Name Prefix, valid (expiration time) or invalid |

FIG. 3B

| Node | Name Prefixes |
|---|---|
| 702 (Root) | /huawei/sandiego/printer |
| 704 | /huawei/sandiego/coffee<br>/huawei/sandiego/tea |
| 706 | /huawei/sandiego/light<br>/huawei/sandiego/AC |
| 708 | /huawei/sandiego/humidity |
| 710 | /huawei/sandiego/temp |
| 712 | /huawei/sandiego/temp |

| Root Node 702 FIB Table ||
| --- | --- |
| Name Prefixes | Next Hop |
| /huawei/sandiego/printer | 702 (Root) |
| /huawei/sandiego/coffee | 704 |
| /huawei/sandiego/tea | 704 |
| /huawei/sandiego/light | 706 |
| /hauawei/sandiego/AC | 706 |
| /hauawei/sandiego/humidity | 704 |
|  | 706 |
| /hauawei/sandiego/temp | 704 |
|  | 706 |

*FIG. 7C*

| Node 708 FIB Table ||
|---|---|
| Name Prefixes | Next Hop |
| /huawei/sandiego/printer | 702 (Root) |
| | 704 |
| /huawei/sandiego/coffee | 702 (Root) |
| /huawei/sandiego/tea | 702 (Root) |
| /huawei/sandiego/light | 704 |
| /hauawei/sandiego/AC | 704 |
| /hauawei/sandiego/humidity | 708 |
| /hauawei/sandiego/temp | 710 |
| | 712 |

*FIG. 7D*

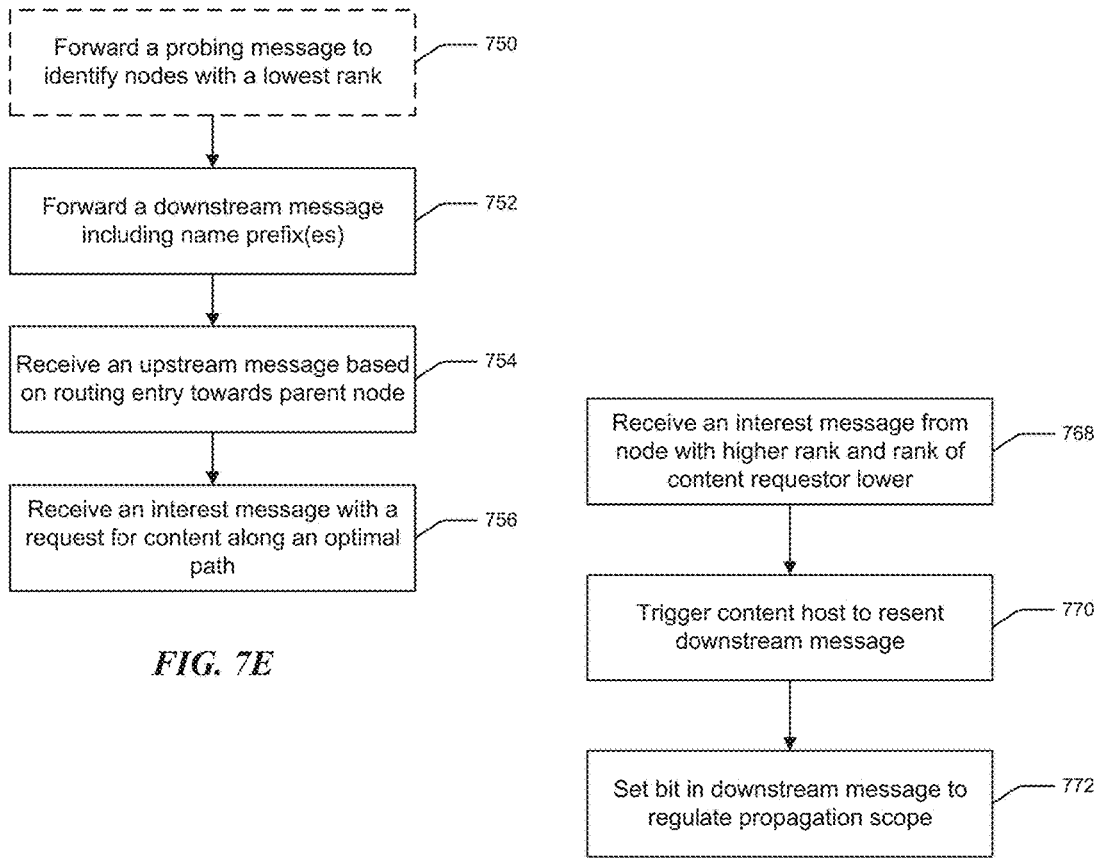

NAMED DATA ROUTING PROTOCOL FOR LOW-POWER AND LOSSY WIDE-AREA NETWORKS (NRPL)

FIELD

The disclosure relates to distributing messages in a low power and lossy network (LLN).

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL," which is a distance vector routing protocol that builds a Destination Oriented Directed Acyclic Graph (DODAG, or simply DAG) in addition to a set of features to bound the control traffic, support local (and slow) repair, etc. The RPL architecture provides a flexible method by which each node performs DODAG discovery, construction, and maintenance.

BRIEF SUMMARY

According to one aspect of the present disclosure, there is provided a method for distributing messages in a low power and lossy network (LLN), comprising forwarding a downstream message including one or more name prefixes hosted at a source node along a nodal route of a routing topology; receiving an upstream message from one or more nodes along one or more nodal routes in the routing topology based on a routing entry towards a parent node as learned from the downstream message; and receiving an interest message, including one or more of a request for content or rank, from the one or more nodes along the one or more nodal routes having an optimal path, the optimal path determined by routing entries stored in the one or more nodes.

Optionally, in any of the preceding aspects, the method further comprising: propagating the downstream message to the one or more nodes having a lowest rank and more than one direct parent node, and propagating the upstream message to a root node in the routing topology, wherein the upstream message includes one or more name prefixes hosted by each of the one or more nodes.

Optionally, in any of the preceding aspects, the one or more nodes having a lowest rank and more than one direct parent node is identified in response to a neighboring node of the source node having a higher rank than a rank of the source node, and the rank of the one or more nodes requesting the content having a lower rank than the rank of the source node.

Optionally, in any of the preceding aspects, the method further comprising forwarding a probing message along the nodal route of the routing topology upon detecting that one or more nodes has more than one direct parent node, the probing message identifying an identifier and address of the one or more nodes and includes an identifier and address of a lowest ranking node.

Optionally, in any of the preceding aspects, the downstream message is forwarded after the one or more nodes joins the routing topology, and the one or more nodes having the one direct parent node ignores the downstream message.

Optionally, in any of the preceding aspects, each of the one or more name prefixes is associated with a valid or invalid tag indicating whether the one or more name prefixes are registered or deregistered in the source node.

Optionally, in any of the preceding aspects, the valid tag indicates an expiration time may be set for a valid period.

Optionally, in any of the preceding aspects, in a storing mode, each of the one or more nodes in the routing topology, except a leaf node, stores a list of routing entries of content such that a common parent node of the one or more nodes requesting the content and the source node forward the interest message without traversing a root node, and in a non-storing mode, a root node maintains a list of routing entries of content within the within the routing topology and the interest message is sent upstream until reaching the root node.

Optionally, in any of the preceding aspects, in the downstream message is a Name Destination Oriented Directed Acyclic Graph (DODAG) Information Object (NDIO) message including one or more of a flag field, a 'G' flag field, a rank field, a reserved field, a DODAG ID field and a name prefix option field.

Optionally, in any of the preceding aspects, in the upstream message is a Name Destination Advertisement Object (NDAO) message including one or more of a flag field, a 'K' flag field, and a name prefix option field.

According to one aspect of the present disclosure, there is provided a non-transitory computer-readable medium storing computer instructions distributing messages in a low power and lossy network (LLN), that when executed by one or more processors, perform the steps of forwarding a downstream message including one or more name prefixes hosted at a source node along a nodal route of a routing topology; receiving an upstream message from one or more nodes along one or more nodal routes in the routing topology based on a routing entry towards a parent node as learned from the downstream message; and receiving an interest message, including one or more of a request for content or rank, from the one or more nodes along the one or more nodal routes having an optimal path, the optimal path determined by routing entries stored in the one or more nodes.

According to one other aspect of the present disclosure, there is provided a network device for distributing messages in a low power and lossy network (LLN), comprising forwarding a downstream message including one or more name prefixes hosted at a source node along a nodal route of a routing topology; receiving an upstream message from one or more nodes along one or more nodal routes in the routing topology based on a routing entry towards a parent node as learned from the downstream message; and receiving an interest message, including one or more of a request for content or rank, from the one or more nodes along the one or more nodal routes having an optimal path, the optimal path determined by routing entries stored in the one or more nodes.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

FIGS. 3A and 3B illustrate example embodiments of a Name DODAG Information Object (NDIO) message format and an NDIO message field with corresponding descriptions.

FIGS. 7A-7D illustrate an example operation of sending messages in a DODAG with routing tables.

FIGS. 7E-7G illustrate example flow diagrams in accordance with the disclosure.

DETAILED DESCRIPTION

Figure 1:
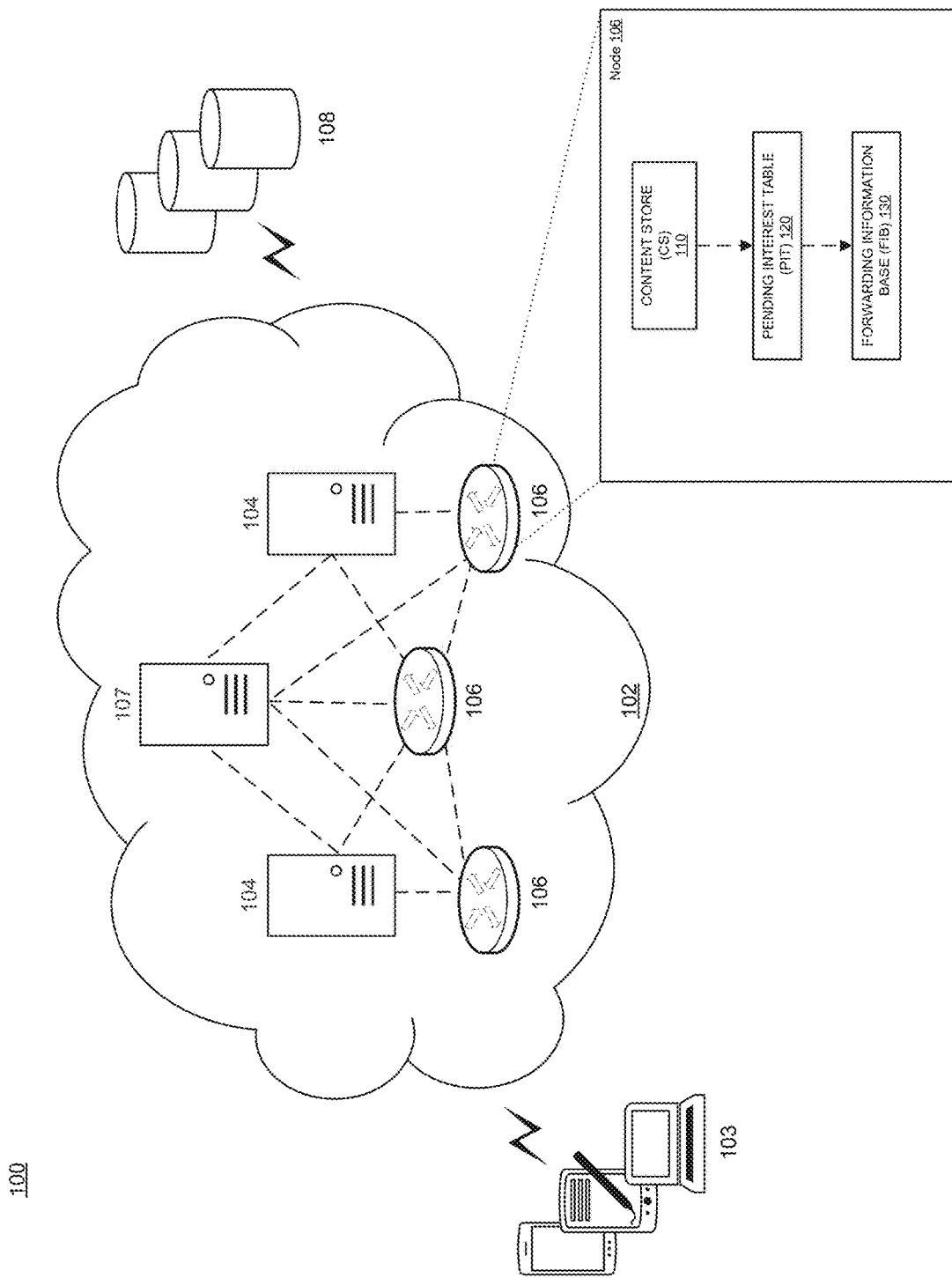
FIG. 1 illustrates a network architecture to provide content as requested by different users in an information centric network.

The disclosure relates to technology for distributing messages in a low power and lossy network (LLN).

Existing protocols such as Open Shortest Path First (OSPF), Ad Hoc On Demand Vecor (AODV), Optimized Link State Routing (OSR) and Intermediate System to Intermediate System (IS-IS) have been found to be unsuitable for LLNs, which impose new and challenging routing requirements, such as lightweight control overhead, routing table scalability and the ability to enforce routing constraints, etc. To address these challenges, a hierarchical naming scheme (referred to herein as the Named Data Networking in LLNs, or NRPL) is adopted to identify routers in a particular RPL instance and DODAG. Each router in the DODAG is named according to an RPL instance that the router locates, the specific DODAG the router attaches to and an assigned router name (i.e., /<RPLInstance>/<DODAG>/<router>). Using this naming scheme, content may be published in both upstream and downstream in the DODAG using an extension (i.e., name prefix option) of the DODAG Information Object (DIO) and DODAG Destination Advertisement Object (DAO) messages of RPL, and may be carried out in both storage and non-storage modes. The extended DIO is referred to herein as the NDIO, and the extended DAO is referred to herein as the NDAO. With the NDIO and NDAO message propagation, an interest message may be forwarded from a requesting node along the most optimal path towards the content producer that is upstream.

It is understood that the present embodiments of the invention may be implemented in many different forms and that claims scopes should not be construed as being limited to the embodiments set forth herein. Rather, these embodiments are provided so that this disclosure will be thorough and complete and will fully convey the inventive embodiment concepts to those skilled in the art. Indeed, the invention is intended to cover alternatives, modifications and equivalents of these embodiments, which are included within the scope and spirit of the invention as defined by the appended claims. Furthermore, in the following detailed description of the present embodiments of the invention, numerous specific details are set forth in order to provide a thorough understanding. However, it will be clear to those of ordinary skill in the art that the present embodiments of the invention may be practiced without such specific details.

The desire for connecting and integrating low-power and constrained devices, such as sensors and actuators, at a global scale has found its way into the Internet of Things (IoT). While conventional IP-based routing approaches for networking functionalities are actively being pursued in different Internet Engineering Task Force (IETF) working groups such as 6LoWPAN, ROLL, CoRE, the host-centric IP paradigm indicates several requirements that would be extremely challenging in low-power and lossy wireless networks (LLNs). Such challenging requirements include, for example, the application-unawareness and limited expressiveness of IP addresses as locators and identifiers, maintenance of end-to-end connection between two resource-constrained devices, lossy interconnections with high packet drop rate, complex mobility support, etc.

Information Centric Networking (ICN), as one of the cutting edge approaches for future network architectures, has been explored for IoT deployments. Many IoT applications are information centric in nature regardless of where the content or service is retrieved. Based on ICN names, which operate in a hop-by-hop and store-and-forward manner, and are independent of identities of the content or service providers, the delivery operation is robust and self-recoverable due to the node mobility or wireless link disconnection.

Among the various efforts being examined in the ICN arena, the Named Data Networking (NDN)/Content Centric Networking (CCN) architecture stands out owning to its simple communication model, hierarchal naming scheme and considerable low overhead in configuration and management. NDN natively supports many-providers-to-one-consumer, one-provider-to-many-consumers communication patterns, which are commonly used in the IoT applications.

To address these challenges, and to overcome the aforementioned inefficiencies of conventional protocols, the disclosure adopts NRPL to identify routers in a particular RPL instance and DODAG.

FIG. 1 illustrates a network architecture to provide content as requested by different users in an information centric network. The network environment 100 may include the ICN 102, also referred to as a content oriented network (CON), having controllers, such as ICN managers 104. The ICN managers 104 may be, for example, a network entity that may have control over a set of network resources in a data plane. In one embodiment, the ICN managers 104 maintain a synchronized record of content hosted by different network entities in the ICN 102. For example, the ICN functionalities may include ICN name resolution, routing, and management. The ICN managers 104 may be deployed in a distributed or in a centralized or in a hybrid manner depending upon the Internet Service Providers (ISP).

ICN 102 may also include routers (or nodes) 106, which may include storage to cache content as the content propagates through the ICN 102. The routers 206 may also be communicatively coupled with the ICN managers 104 and may be configured to process requests received from users for accessing the content via clients or user devices 103, such as a mobile device or computer.

The routers 106 may collaborate for caching content with one or more other routers 106 in the network, such as an ICN, which may be configured as follows. A router 106 may comprise a content store (CS) 110, pending interest table (PIT) 120, and forwarding information base (FIB) 130. The CS 110 may be used (e.g., in a storage or memory unit) to cache (for relatively short time) or store (for relatively longer time) content data. The CS 110 may also receive and associate interests (user requests for content) with corresponding content data (requested content).

The PIT 120 may be any data structure (e.g., a table, list, or database) used to record and keep track of the received interests (requests for content) that are being served or pending (until the corresponding requested content data is received). The interests may be associated in the PIT 120 with the next hops (or next hop interfaces or faces) of the collaborative caching router 106 on which the interests were received.

The FIB 130 may be any data structure (e.g., a table, list, or database) used to associate content or namespace with corresponding ports or faces (for next hops) on which the interests and content data are received and forwarded, depending on the implemented forwarding policies. The FIB 130 entries may indicate the next hops on which content or packets (interests and data) may be forwarded. The FIB 130 may be a data structure or a sub-data structure (e.g. a data structure within a data structure), such as a table, list, or database which may be maintained and operated (to process content interest and data) at a data plane or forwarding plane. The data plane may comprise operations for transferring content information (interest and data) in the CON, and the control plane may comprise operations related to controlling network operations including the data plane operations. The data structures above may be stored and maintained in a storage or memory unit of the router 106.

To carry out the Interest and Data packet forwarding functions, the router 106 maintains the three data structures described above, namely: (1) a CS 110 acting as a temporary cache of Data packets the router has received, which cached Data packets may be used to satisfy future Interests; (2) a PIT 120 to store all the Interests (or a subset of them for which stateful forwarding is enabled) that a router has forwarded but not satisfied yet, where each PIT entry records the data name carried in the Interest (or a router designated name associated with the Interest), together with its incoming and outgoing interface(s); and (3) a FIB 130 as a routing/forwarding table which maps name components to interfaces, and is populated by a name-prefix based routing protocol for instance through the routing information base (RIB) for which the name prefix based routing protocol originates, and can have multiple output interfaces for each prefix. Additionally, the router 106 may include forwarding policies and rules to handle forwarding of packets.

In one example embodiment, when the router 106 receives an Interest packet (incoming interest or interest message), which includes for example the name of the content that the requester (client) wants to request, the router 106 first checks to determine if there is a locally cached copy of the content in the CS 110. If a locally cached copy of the content exists in the CS 110, the router 106 can reply to the Interest by sending the content copy to the incoming face of the Interest.

If no locally cached copy of the content exists, the content router 106 checks to determine if there are pending interests in the PIT 120 with the same content name. If a request targeting the same content name exists and is pending, then the incoming face of the new Interest is added to the face list for the content name in the PIT 120. Accordingly, the new interest is no longer required to be forwarded.

Otherwise, the router 106 forwards the Interest by performing a lookup, such as a longest-prefix matching based lookup, in the FIB 130 based on the content name. The Interest is then stored in the PIT 120 by creating a new entry. If no matched entry is maintained in the FIB 130, then the Interest is either dropped forwarded to a face or a multiple of faces other than the incoming face, depending on the forwarding strategy implemented by the receiving router.

The network environment 100 may further include content or data stores 108, which may store the content or collections of content, such as files, images, videos, and the like. Accordingly, the managers 104 and the routers 106 may communicate with the data stores 108 to provide the content to different users. Additionally, the network environment 100 may include one or more user devices 110, including for example and without limitation, desktop computers, handheld devices, laptops or other portable computers, network computers, mobile phones, landline phones, and the like.

Figure 2:
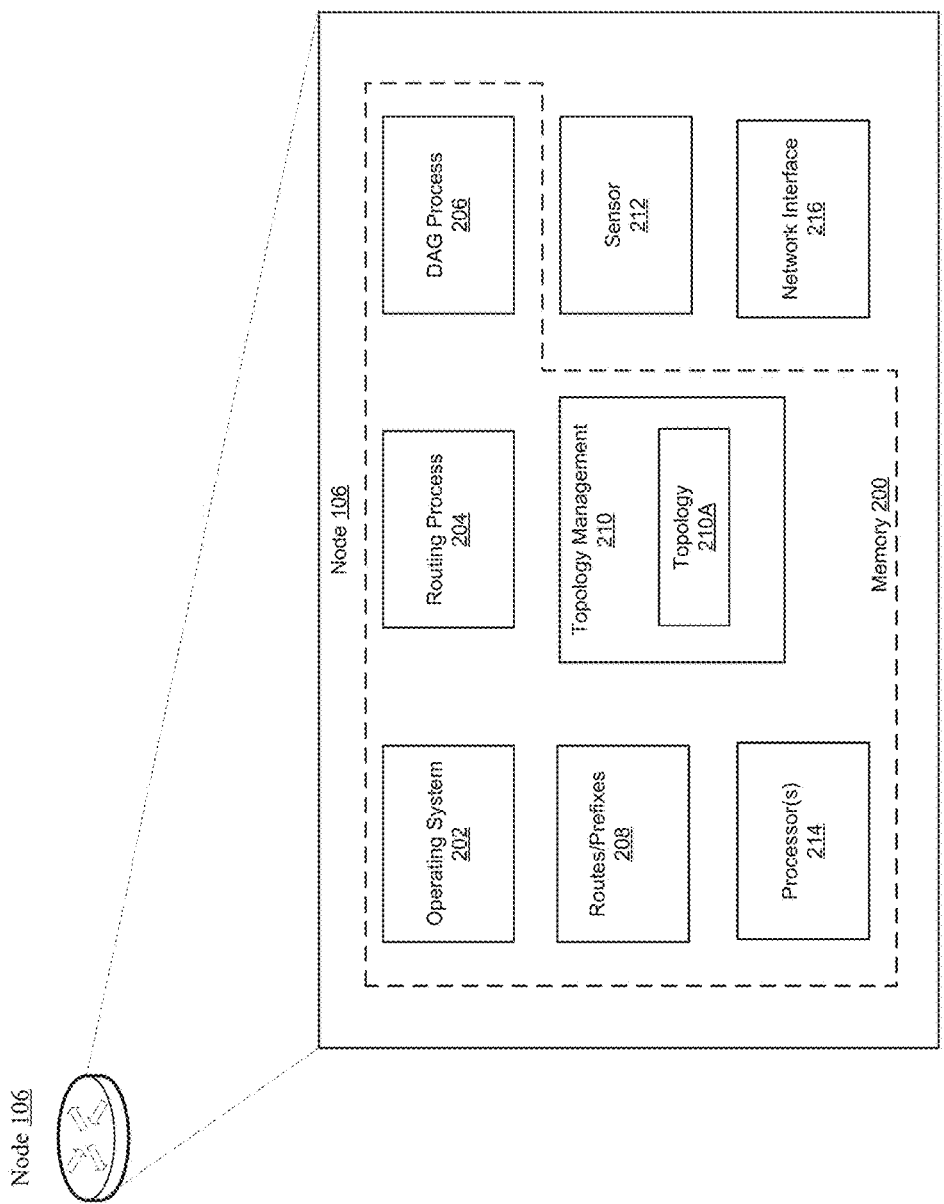
FIG. 2 is a block diagram of an example node of the network described in the embodiment of FIG. 1.

FIG. 2 is a block diagram of an example node of the network described in the embodiment of FIG. 1. Node 106 may be, for example, a root node, child node, intermediate node, leaf node or other node (e.g., sensor) in the network. The node 106 may include, for example, network interfaces 216, sensor 212 (e.g., sensors, actuators, etc.), a processor(s) 214, and a memory 200. The memory 200 may be interconnected to each of the sensor 212 and the network interface 216 via a bus (not shown).

The network interfaces 216 may be configured to transmit and/or receive data using a variety of different communication protocols, including, inter alia, TCP/IP, UDP, wireless protocols (e.g., IEEE Std. 802.15.4, WiFi, Bluetooth®), Ethernet, powerline communication (PLC) protocols, etc.

The memory 200 includes storage locations that are addressable by the processor(s) 214 and the network interfaces 216 for storing software programs and data structures or topologies associated with the embodiments described herein. The processor(s) 214 may comprise necessary elements or logic adapted to execute the software programs and manipulate the data structures, such as routes or prefixes 208. An operating system 202, portions of which are typically resident in memory 200 and executed by the processor, functionally organizes the device by invoking operations in support of software processes and/or services executing on the node. These software processes and/or services may comprise routing process/services 204, which may include DAG process 206.

In root nodes (or any management node), topology management 210 and associated stored topologies 210A may also be present in memory 200. It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process).

Routing process 204 includes, for example, computer executable instructions executed by the processor(s) 214 to perform functions provided by one or more routing protocols. These functions may be configured to manage a routing/forwarding table (such as FIB 130) containing, e.g., data used to make routing/forwarding decisions. Routing may be proactive or reactive.

In proactive routing, connectivity is discovered and known prior to computing routes to any destination in the network, e.g., link state routing such as OSPF, IS-IS, or OLSR.

In reactive routing, neighbors are discovered (i.e., does not have an a priori knowledge of network topology), and in response to a needed route to a destination, sends a route request into the network to determine which neighboring node may be used to reach the desired destination. Example reactive routing protocols may comprise AODV, Dynamic Source Routing (DSR), Dynamic MANET On-demand Routing (DYMO), etc. In one embodiment, on devices not capable or configured to store routing entries, routing process 204 may consist solely of providing mechanisms necessary for source routing techniques.

An example protocol specified in an Internet Engineering Task Force (IETF) Internet Draft, entitled "RPL: IPv6 Routing Protocol for Low Power and Lossy Networks" (RFC 6550) by Winter, at al. (March 2012 version), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a DAG for use in routing traffic/packets, in addition to defining a set of features to bound the control traffic, support repair, etc.

A DAG (examples of which are provided below) is a directed graph having the property that all edges are oriented in such a way that no cycles (loops) are supposed to exist. Edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a DODAG is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Additionally, a tree is a kind of DAG, where each node in the DAG generally has a parent.

DAGs may be constructed by the use of an Objective Function (OF) which defines how a routing metric is computed. That is, the OF specifies how routing constraints and other functions are taken into account during topology (graph) construction. For example, a DODAG may be constructed in a way where the Expected Number of Transmissions (ETX) of where the current amount of battery power of a node is considered.

Metrics used to select paths (e.g., to parents) may include, for example, cost, delay, latency, bandwidth, ETX, etc., Additionally, constraints that may be placed on the route selection may include various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs).

Building a DAG may utilize a discovery mechanism to build a logical representation of the network, including routing information, so that routers know how to forward packets toward a particular destination. Control messages may be transmitted among the nodes within the network for discovery and route dissemination when building a DAG.

In RPL, four types of control messages for topology maintenance and information exchange are defined: (1) a DIO is the primary source or routing control information and stored information such as current rank of a node, current RPL Instance, the IPv6 address of the root, etc.; (2) a DAO that enables support of down traffic and is used to propagate destination information upwards along the DODAG; (3) DODAG Information Solicitation (DIS) which enables a node to require DIO messages from a reachable neighbor; and (4) a DAO-ACK that is sent by a DAO recipient in response to a DAO message. It will be appreciated that embodiments of the disclosure, as will be explained below, address the optional fields (e.g., a name prefix) in the format of the DIO and DAO messages to extend the capability of the DIO and DAO messages in order to improve routing over conventional RPL message routing.

In RPL, a DIO message is transmitted from the root node(s) or device(s) of the DAG downward toward the leaf nodes, informing each successive receiving device how to reach the root device. Accordingly, a DAG is created in the upward direction toward the root device. The DAO message may then be returned from the leaves to the root device(s), informing each successive receiving node in the other direction how to reach the leaves for downward routes. This process helps build routing tables to send downward messages to any node in the DAG. Nodes that are capable of maintaining a routing state may aggregate routes from DAO messages that they receive before transmitting a DAO message. Nodes that are not capable of maintaining a routing state may attach a next-hop parent address. The DAO message is then sent directly to the DODAG root that can in turn build the topology and locally compute downward routes to all nodes in the DODAG.

FIGS. 3A and 3B illustrate example embodiments of a NDIO message format and an NDIO message field with corresponding descriptions. In particular; FIG. 3A illustrates an NDIO message 302 which carries one or more name prefixes that are hosted by an originating node, and table 304 of FIG. 3B describes each of the fields in the NDIO message format 302.

An NDIO message first allows a node to discover an RPL Instance by storing the corresponding "RPLInstanceID" in the first data field. The "RPLInstanceID" is used for identification of an independent set of DODAGs. The second and the third fields include the DODAG Version, which is incremented each time a DODAG reconstruction is required, and the Rank, the node's position with respect to a DODAG root, of the sending node of the message.

The 'G' flag indicates whether the NDIO message sender can satisfy the application-defined criteria for the name prefix hosted in the nodes within the DODAG. If the 'G' flag is not set, the DODAG is said to be floating. This may happen when a DODAG is disconnected from the rest of the network and supports only connectivity to its nodes An NDIO message may also be extended by the use of options, such as one or more name prefixes. In the Flags field, the lowest bit is set to "1" to indicate that this is an NDIO message that carries the name prefixes in the option. The name prefix option can contain one or multiple name prefixes from the parent node. Each name prefix is associated with a valid or invalid tag indicating whether the name prefix is registered or deregistered in the host. If it is labelled with a valid tag, an expiration time can be set up for the valid period.

The Reserved field regulates the propagation scope of the NDIO messages, which will reach the lowest rank node with more than one parent. For example, setting the Reserved filed to '1' indicates the NDIO message should be sent to the lowest rank node with more than one parent.

Figure 4:
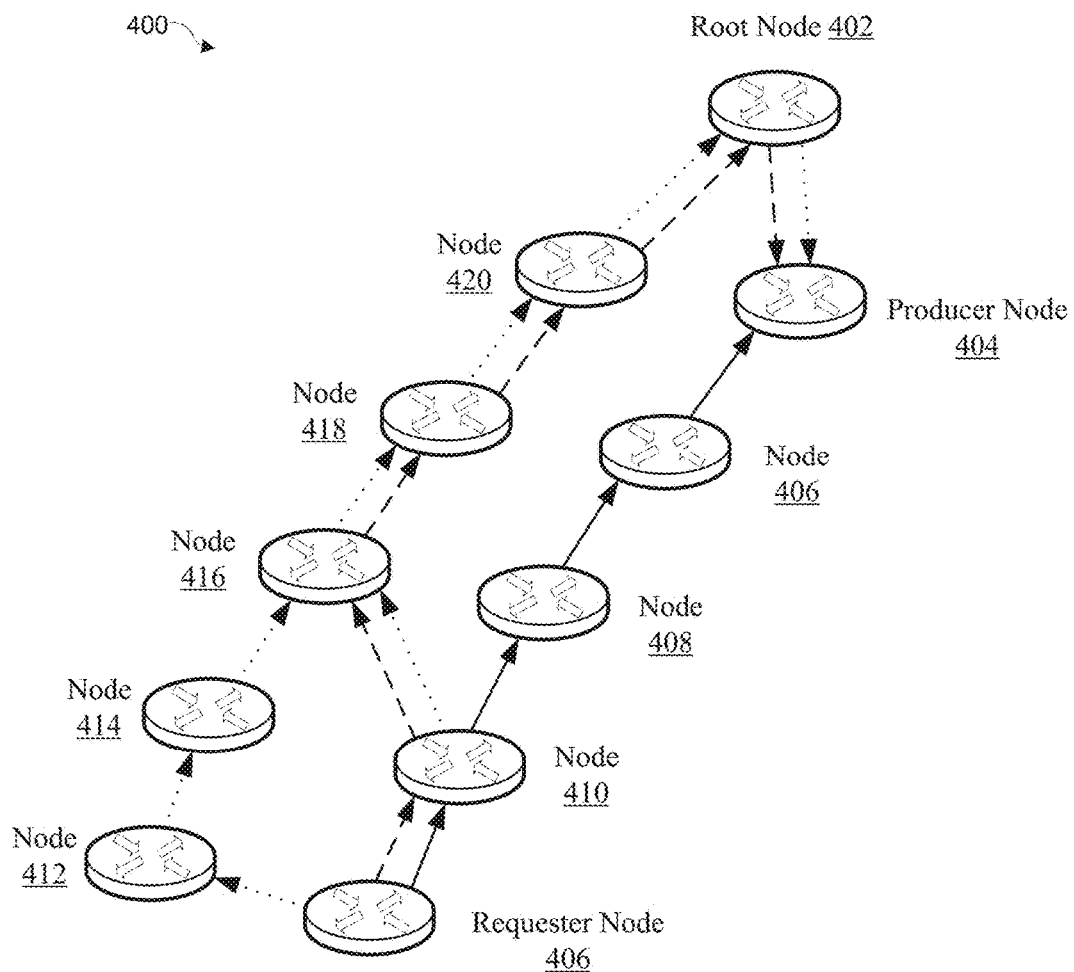
FIG. 4 illustrates an example routing topology in which upstream content is being requested.

FIG. 4 illustrates an example DODAG in which upstream content is being requested. Upward routing is a standard procedure which enables network devices to send data to a common data node or gateway. In LLNs, nodes periodically generate data packets which have to make their way through the network. In general, and as explained above, there are three types of nodes in an RPL network: (1) root nodes that provide connectivity to another network, (2) intermediate or router nodes, which typically advertise topology information to neighboring nodes, and (2) leaf nodes which join a network but do not send NDIO messages.

Construction of the topology begins at root node 402, which starts advertising the information about the DODAG 400 using an DIO message (not shown) to nodes 404-420. Each node that receives the DIO message runs an algorithm to choose an appropriate parent node. For example, node 418 executes an algorithm that will select parent node 420. The choice may be made based, for example, on metrics and constraints defined by the OF. Afterwards, each of the nodes computes a rank and, if the node is a router (e.g., an intermediate node that is not a root or leaf node), updates the rank in the DIO message to be sent to neighboring nodes. The nodes repeat the process until an DIO message reaches a leaf node or when no more nodes are left within range.

The neighboring nodes (i.e., nodes 404 and 420) of the root node 402 will receive and process the DIO message and determine whether to join the DODAG 400. Once a node has joined the DODAG 400, it has a route towards the root node 402. As noted above, if the node is configured to be a router, each of the nodes start advertising a new DIO message to its neighboring nodes. Otherwise, if the node is a leaf node, the node joins the DODAG 400 without sending an DIO message.

In one embodiment, after a node joins the DODAG 400, the parent node (the node that sent the DIO message) will begin sending (re-sending) a series of NDIO messages (FIG. 3A). For example, when node 408 joins the DODAG 400, parent node 406 will begin sending a series of NDIO messages. While there is no requirement that the NDIO message be advertised to child nodes, the advertised NDIO message enables the child node to learn the name prefixes hosted by a respective parent node. In one embodiment, when a child node has a single parent node, the child node may ignore the NDIO message. That is, the child node may ignore the advertised NDIO message since the parent node is the single upstream node to which any interest message may be forwarded.

In another embodiment, when a child node joins multiple DODAGs 400 and has more than one parent node, the NDIO message from the parent node will provide information (e.g., name prefixes) to the child node. The information in the NDIO message may help a child node determine which parent node to forward an interest message when requesting content.

Typically, as noted above, the NDIO message will not be propagated beyond direct child nodes. For example, let us assume that requester node 406 is interested in content from producer node 404, which hosts the content and has a specific content prefix. In this case, the producer node 404 sends an NDIO message to direct child node 406, which would not propagate the NDIO message further. When the requester node 406 sends an interest message for the content hosted by the parent node 404, the interest message will follow a nodal path in the DODAG 400 until reaching the producer node 404. As the requester node 406 has two parent nodes (nodes 410 and 412), and one parent node 410 has two parents, the interest message being forwarded may take one of three paths to reach the producer node 404. The three paths are depicted by the dotted, dashed and solid arrow lines. As shown, the solid arrow lines represent the optimal (shortest or least number of hops) path from the requester node 406 to the producer node 404. However, without propagation of the NDIO message beyond direct child nodes, any one of the three paths may be randomly selected, as the requestor node is unaware of the optimal path.

In one embodiment, and in the storing mode (described below with reference to FIG. 6A), if a parent node determines that there are child nodes in the DODAG hierarchy rooted from itself, which have more than one parent node, then the NDIO message will be propagated further in the DODAG 400 (beyond direct child nodes). Determination of a child node having more than one parent will be explained below.

Following the example above, and in order to enable the interest message sent by a requester node (e.g., requester node 406) to take the optimal path, a rank (a node's position in the DODAG with respect to the root node, as explained above) of the requester node 406 is included in the interest message. In one embodiment, when the producer node (e.g., producer node 404) hosting the content prefix receives an interest message from a node having a higher rank than itself, and the rank of the requester node in the interest message is lower, the producer node 404 may determine that one or more downstream nodes exist that have more than one direct parent node. For example, if producer node 404 receives an interest message from root node 402, which has a higher rank than the producer node 404, and the rank of the requester node 406 is lower than a rank of the producer node 404, then the producer node 404 may determine that one or more downstream nodes have more than one direct parent node.

The NDIO message that is further propagated to the additional nodes in the DODAG 400 will include a lowest bit set to '1' in the Reserved field (see FIG. 3A). The lowest bit in the Reserved field will regulate the propagation scope of the NDIO messages, such that the NDIO message will reach the lowest rank node with more than one parent. For example, the NDIO messages from producer node 404, send to child node 406, will be additionally forwarded by child node 406, to nodes 408 and 410, until reaching the requester node 406.

In one embodiment, and before forwarding the NDIO message with the lowest bit in Reserved field set to '1' from the producer node 404, the direct child node (e.g. child node 406) will send a probing message (not shown) to its own children in the entire sub-tree that originates from itself. Probing is often utilized for collecting information that is essential for maintaining and optimizing performance of the network. In general terms, a probe is an object used or an action taken for the purpose of learning something about the state of the network. For example, a probe message can be sent to see whether a destination actually exists. One common utility for sending such a probe message is PING. The recipient (destination) node sends a response to the probing node in response to the probe message. The response may include any network information available to the recipient node.

In the disclosed example, the probing message collects information in nodes of the DODAG 400 to determine whether a child node has more than one parent node. Additional, the probing message collects information that is determinative of whether the lowest rank child node has more than one parent. In the depicted example, the probing message sent by child node 406 will return an identifier and address of the requestor node 406 to child node 406. The DODAGID field in the NDIO message (FIG. 3A) will carry the address of the lowest rank child node that has more than one parent. The NDIO message will be propagated until it reaches the address. Accordingly, the child nodes in the DODAG 400 are able to learn which parent node an interest message should be forwarded to in order to reach the content host with the smallest number of levels (hops) passed in the DODAG 400, thereby resulting in the interest message being sent along an optimal path.

Figures 5A, 5B:
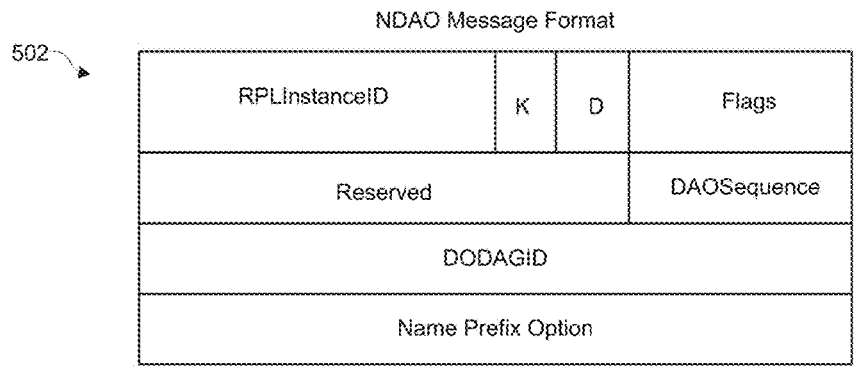
FIGS. 5A and 5B illustrate example embodiments of a Name Destination Advertisement Object (NDAO) message format and an NDAO message field with corresponding descriptions.

FIGS. 5A and 5B illustrate example embodiments of an NDAO message format and an NDAO message field with corresponding descriptions. In particular, FIG. 5A illustrates an NDAO message 502 which is sent from a child node to notify the name prefixes hosted by the child node (or maintained in a FIB) to upstream nodes, and table 504 of FIG. 5B describes each of the fields in the NDAO message format 502.

Similar to the NDIO message 302, the NDAO message 502 includes several fields. The 'K' flag indicates whether the sender of the NDAO expects to receive a DAO-ACK in response, and the Flags field sets the lowest bit to '1' to indicate the message is an NDAO message that carrier a name prefix(es) compared to a conventional DAO message.

An NDAO message may also be extended by the use of an options field, such as one or more name prefixes. As noted above, the NDAO message is sent from a child node to notify the name prefixes hosted by itself or maintained in its FIB to its upstream nodes. In both the storing and non-storing mode, the NDAO message is propagated until it reaches the DODAG root. In the storing mode, the receiving node processes the NDAO message and builds the FIB entries for the name prefixes included in the NDAO message, while in the non-storing mode, the intermediate receiving node only forwards the NDAO message to its parent without processing it. In other words, in the storing mode, every node other than the leaf node builds the FIB entries for name prefixes hosted by all its children nodes. In the non-storing mode, only the DODAG root builds the FIB entries for name prefixes hosted by all nodes in the DODAG. Storage and non-storage modes are described below with reference to FIGS. 6A and 6B.

The RPL protocol also supports security for the basic control messages of DIO and DAO, and also covers both the base message as well as any options. As the NDIO and NDAO messages are inherited from the DIO and DAO messages with the name prefix option, the NRPL protocol also supports security for control messages and NDIO and NDAO messages. In a pre-installed security mode, the nodes that join an RPL instance and DODAG have pre-installed keys which could enable them to process and generate secured NDIO and NDAO messages. In an authenticated security mode, similar to the pre-installed security mode, the pre-installed keys are used by a node to join an RPL instance and DODAG as a leaf. However, if a node wants to become a forwarding router, a second key must be obtained from an authentication authority.

Figure 6A:
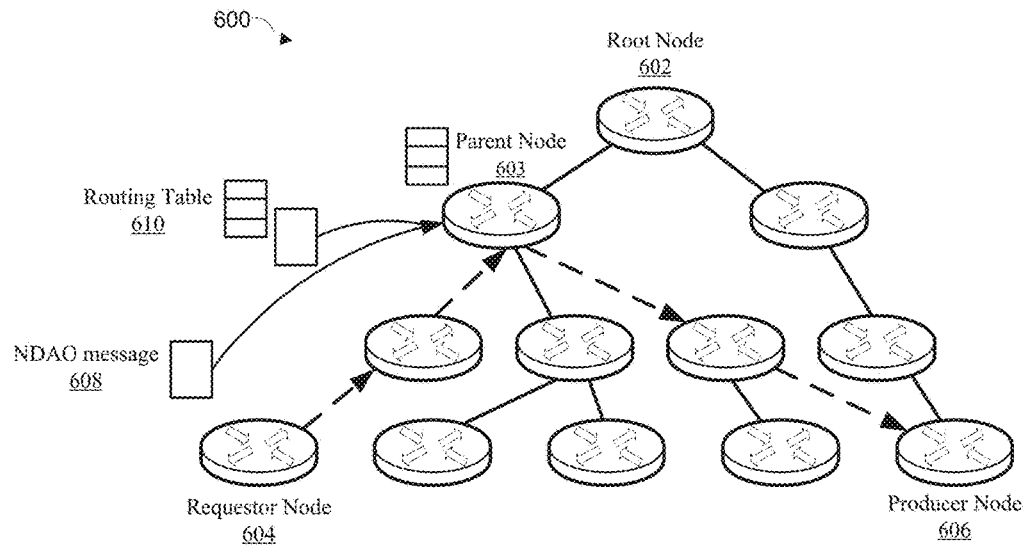
FIGS. 6A and 6B illustrate example routing topologies in storing and non-storing mode.
Figure 6B:
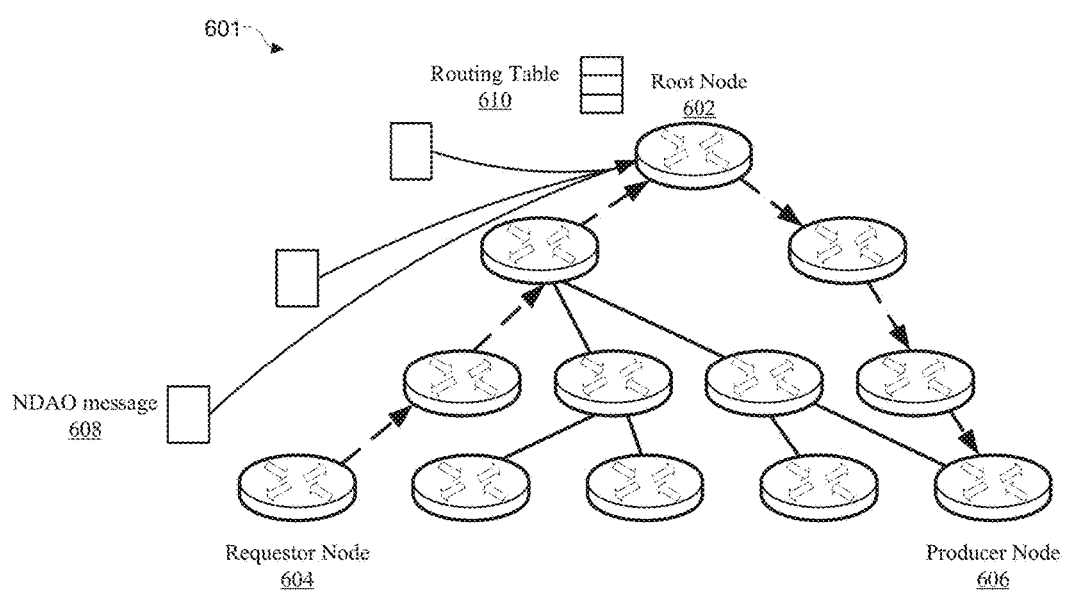

FIGS. 6A and 6B illustrate example routing topologies in storing and non-storing mode. As nodes in each DODAG may be either storing or non-storing mode, the name based routing protocol described herein may also operate in either of these two modes. As will become apparent in the discussion below, and for ease of explanation, the figures only illustrate the NDAO message 608 and routing table 610 for a limited number of the nodes in the DODAGs 600 and 601. However, it is appreciated that each node, depending on the storage mode, will generate an NDOA message 608 and/or store a routing table 610.

With reference to FIG. 6A, illustrating a routing topology in storing mode, each node generates a NDAO message 608 and sends the NDAO message 608 as a unicast to the parent nodes which maintain downward routing tables 610. When a node sends a NDAO message, the node keeps the parent address field in the transit information option empty since a node's responsibility is not to advertise the parent set, but to announce prefixes that are reachable through the parent. In one embodiment, if the node is a router, the target option is used in the NDAO message 608 to advertise a prefix. In one other embodiment, if multiple prefixes are being advertised, the NDAO message 608 is extended with multiple target options.

Using storing mode, each node (other than the leaf node) may be in charge of handling any interest message or data packet forwarding. In one embodiment, each node runs content centric network daemon (CCND) and an RPL protocol with NDIO and NDAO message propagation and processing. Accordingly, a common parent, such as parent node 603, of the requester node 604 (content requestor) and the producer node 606 (content producer) may forward an interest message without being propagated to the DODAG root node 602. Instead, as depicted in FIG. 6A, the nodal path taken by the interest message in storing mode follows the dotted arrow lines from requestor node 604, through parent node 603, to producer node 606.

Turning to FIG. 6B, illustrating a routing topology in non-storing mode, each node generates an NDAO message 608 and sends it to the DODAG root note 602. The time generation interval in which NDAO messages 608 are sent depends on the specific implementation. However, in RPL, the needed delay between two NDAO sending operations may be inversely proportional to the rank. In this manner, if a node in the topology 601 is far away from the root node 602, that node will generate NDAO messages 608 more frequently than a node in the topology 601 positioned more closely. Additionally, each node extends the NDAO message 608 by using the transit information option. In the parent address field the IPv6 address of a parent node is stored. Thus, a typical non-storing node may use multiple transmit information options in order to report its complete parent set to the root node 602. The resulting NDAO message 608 may then be sent to the DODAG root node 602 along the optimal path created during the process.

Different from the storing mode, in non-storing mode, none of the nodes in the DODAG, other than the DODAG root node 602, store information propagated by the NDAO message 608. Rather, the interest message sent by a requestor node 604 are forwarded upstream until they reach the DODAG root nod 602, which maintains the routing table 610 (i.e., FIB) for all of the content within the DODAG (i.e., hosted by nodes in the DODAG). The DODAG root node 602 is in charge of attaching the producer (e.g., producer node 606) address in the interest message. For example, the path taken by the interest message in the non-storing mode follows the dotted arrow lines from requestor node 604, through root node 602, to producer node 606.

Figures 7A, 7B:
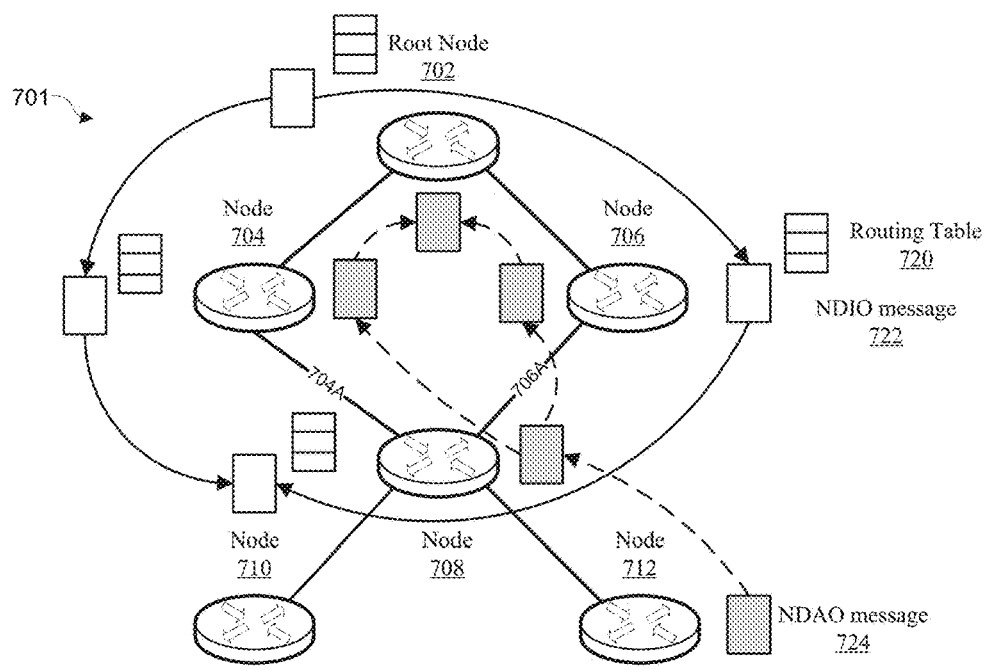

FIGS. 7A-7D illustrate an example operation of sending messages in a DODAG with routing tables. For purposes of discussion, the DODAG 701 depicted in FIG. 7A includes a root node 702, intermediate nodes 704, 706 and 708 and leaf nodes 710 and 712, with the topology in a storing mode. Each of the nodes has an identifier in the form of "/RPLInstance/DODAG" and hosts name prefixes shown in the table of FIG. 7B. Thus, as shown in the table of FIG. 7B, root node 702 has a name prefix of "/huawei/sandiego/printer," intermediate node 704 has the name prefixes of "/huawei/sandiego/coffee" and "/huawei/sandiego/tea," intermediate node 706 has the name prefixes of "/huawei/sandiego/light" and "/huawei/sandiego/AC," intermediate node 708 as the name prefix of "/huawei/sandiego/humidity" and leaf nodes 710 and 712 have the name prefix of "/huawei/sandiego/temp."

In the example operation, the root node root 702 sends an NDIO message to direct child nodes 704 and 706 with the name prefix option specified as "/huawei/sandiego/printer," where the name prefix is associated with a tag of valid for 24 hours (e.g., the name prefix is valid for 24 hours). The path of the NDIO message 722 is represented by the solid lines with arrows. Each of the intermediate nodes 704 and 706, as parent nodes (with the same rank) to intermediate node 708, send the NDIO message 722 to intermediate node 708. The NDIO message 722 from intermediate nodes 704 and 706 notify intermediate node 708 of the respective name prefixes. Thus, two paths exist (a first path 704A between intermediate node 704 and intermediate node 708, and a second path 706A between intermediate node 706 and intermediate node 708) to reach the name prefix through either intermediate node 704 or intermediate node 706 with equal expense (depending on the objective function). Since intermediate node 708 is the only parent to child (and leaf) nodes 710 and 712, the NDIO message 722 is not sent any further.

The NDAO message 724 is sent by each of the nodes in the DODAG (except for the root node 702) upstream until the NDAO message 724 reaches the root node 702. The NDAO messages 724 are sent along the path represented by dashed lines with arrows. It is appreciated that although the NDAO message 724 is only shown as being sent from leaf node 712, the NDAO message 724 may equally be sent by leaf node 710.

In one embodiment, each of the intermediate nodes 704, 706 and 708 in the DODAG send the NDAO message 724 along a nodal path until receiving the NDAO messages 724 from direct child nodes. For example, intermediate node 708 sends NDAO message 724 until receipt of NDAO message 724 from child (leaf) nodes 710 and 712. Once intermediate node 708 receives the NDAO messages 724 from leaf nodes 710 and 712, the intermediate node 708 understands (learns) that the name prefix of "/huawei/sandiego/temp" (the name prefix of leaf nodes 710 and 712) may be reached at downstream nodes (leaf nodes 710 and 712).

After receiving the NDAO message 724 from leaf nodes 710 and 712, the routing table 720 is updated to include its own name prefix (in storage mode), as well as the name prefixes hosted by the downstream nodes (leaf nodes 710 and 712). Thus, any NDAO message 724 sent by intermediate node 708 includes the name prefix of "/huawei/sandiego/temp" (the name prefix of leaf nodes 710 and 712) and "/huawei/sandiego/humidity" (the name prefix of intermediate node 708), as shown in the FIB table of FIG. 7D. Similarly, intermediate nodes 704 and 706 send respective NDAO messages 724 to the root node 702. Intermediate nodes 704 and 706, having received the NDAO message 724 from intermediate node 708, include each of the name prefixes stored in the FIB of intermediate node 708. Intermediate node 704 additionally includes its own name prefix of "/huawei/sandiego/coffee" and "/huawei/sandiego/tea", and intermediate node 706 additionally includes its own name prefixes of "/huawei/sandiego/light" and "/huawei/sandiego/AC". Thus, when intermediate nodes 704 and 706 send NDAO messages 724 to root node 702, the FIB in the root node 702 includes the name prefixes of every node hosted in the DODAG, including its own name prefix, as shown in FIG. 7C.

FIGS. 7E-7G illustrate example flow diagrams in accordance with the disclosure. In the following discussion, the procedures disclosed in the flow diagrams may be implements by a node in of a routing topology. For example, routers 106 of the system depicted in FIGS. 1 and 2, or the nodes depicted in FIGS. 4, 6A, 6B, 7A and 9 may implement the procedures below. However, it is appreciated that implementation is not limited to such components and devices.

Turning to FIG. 7E, the system implements a procedure to distribute messages along an optimal path of the routing topology. Optionally, at 750, a probing message is forwarded along a nodal route of the routing topology upon detecting that child nodes in the routing topology have more than one direct parent node. The probing message identifies an identifier and address of the child nodes and includes an identifier and address of a lowest ranking node.

At 752, a downstream message, such as an NDIO message, including one or more name prefixes hosted by a source node, is forwarded along a nodal route of a routing topology.

At 754, an upstream message, such as an NDAO message, is received from child nodes aloha nodal routes in the routing topology based on a routing entry towards a parent node, as learned from the downstream message.

At 756, an interest message, including for example a request for content or rank, from the child nodes along the nodal route having an optimal path. In one embodiment, the optimal path determined by routing entries stored in the one or more nodes.

In FIG. 7F, the downstream and upstream messages are propagated in the routing topology. In one embodiment, at 758 and 760, the downstream message is propagated to the child nodes having a lowest rank and more than one direct parent node, and the upstream message is propagated to a root node in the routing topology, where the upstream message includes a name prefix(es) hosted by each of the child nodes.

If the routing topology is a non-storing mode, at 764, a root node maintains a list of routing entries of content within the routing topology and the interest message is sent upstream until reaching the root node.

In a storing mode, at 766, each of the child nodes in the routing topology, except a leaf node, stores a list of routing entries of content such that a common parent node of the child nodes requesting the content and the source node forward the interest message without traversing a root node.

In FIG. 7G, an interest message is received at a host node (content host) from a neighboring node that has a higher rank, and in which the requesting node (node requesting the content) has a lower rank at 768. This triggers the host node, at 770, to send a downstream message (NDIO message) at 770, in which the NDIO message includes the name prefix (es) of the host node. Additionally, a bit is set in the NDIO message (Reserved field) to regulate the scope of propagation to the lower ranking node with more than one parent node at 772.

Figure 8A:
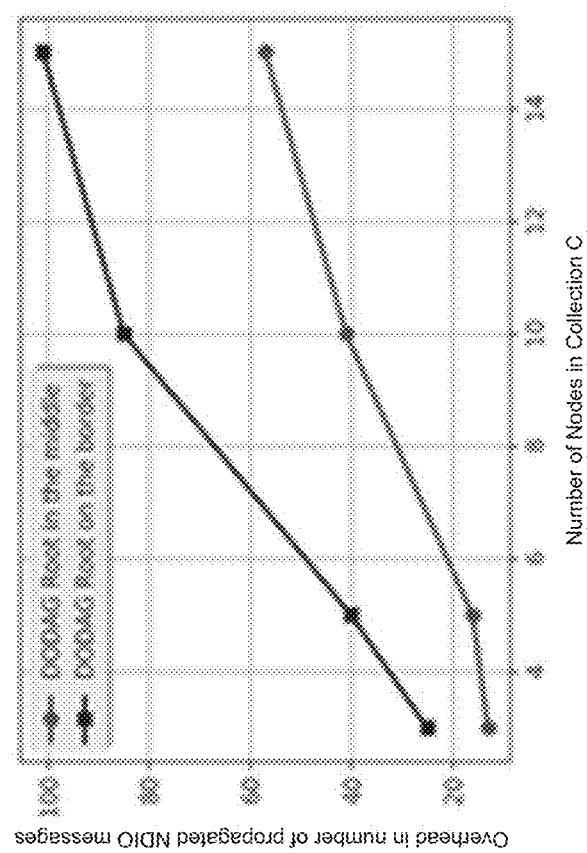
FIGS. 8A-8E illustrate NDIO and NDAO overhead and performance evaluation data.

FIGS. 8A-8E illustrate NDIO and NDAO overhead and performance evaluation data. The additional control message overhead for generating the FIB in each node, other than the leaf nodes, includes the NDIO and NDAO message propagation. FIG. 8A illustrates NDIO control message overhead and performance improvement due to NDIO message propagation. The horizontal axis shows the number of nodes in a collection {C}, and the vertical axis shows the overhead in the number of propagated NDIO messages. Assuming NDIO message propagation is necessary, the total control message overhead introduced by the NDIO messages is calculated by Equation (1) below. The collection {C} includes all the nodes in the DODAG which need to send the NDIO message. $Rank_i$ denotes the rank of the ith node in the collection. $Rank_{lowesti}$ denotes the lowest rank of the downstream nodes for ith node which have multiple parents. ($Rank_i$-$Rank_{lowesti}$) calculates the number of hops in the DODAG that the NDIO message needs to travel. $Size_{NDIO}$ denotes the size of a NDIO message (For calculation simplicity, we assume each NDIO message carries one name prefix, however multiple content prefixes can be carried in NDIO as well). $Cp_i$ denotes the number of content prefixes hosted by the ith node. Thus, the total control message overhead is:

$$OH_{NDIO} = \sum_{i \in \{C\}} (Rank_i - Rank_{lowesti}) * Size_{NDIO} * Cp_i \quad (1)$$

As illustrated, the larger the number of nodes the collection {C} generates, the more NDIO message propagation will occur in the DODAG. This indicates that there are an increasing number of nodes having more than one possible path to reach a content host (albeit perhaps with the varying cost). Employing the aforementioned NDIO message propagation, the optimal path may be located.

Figure 8C:
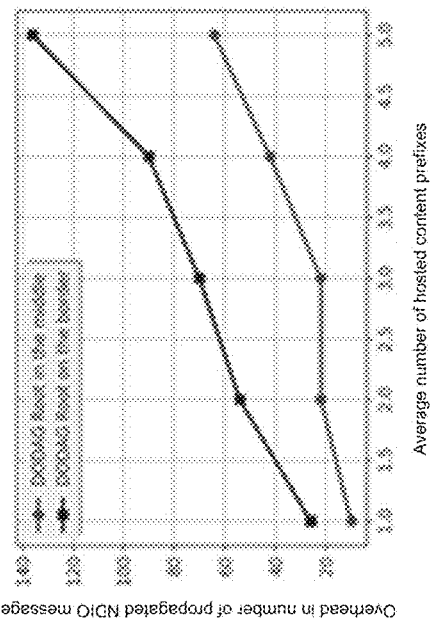
Figure 8E:
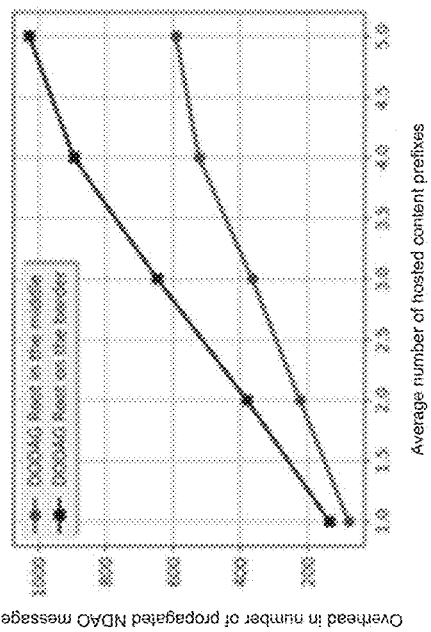
Figure 8B:
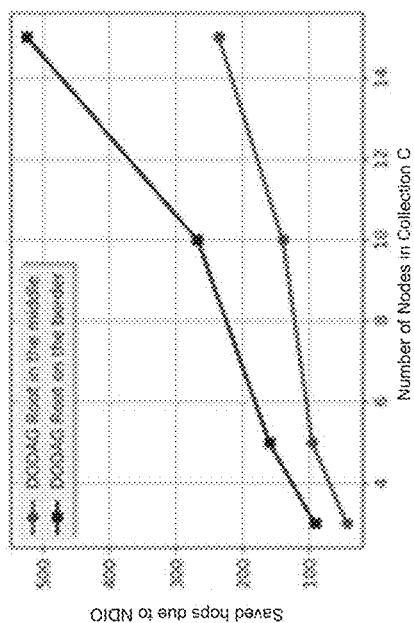

FIG. 8B Error! Reference source not found. shows a number of saved hops f or a content request due to the NDIO message propagation versus the number of nodes in collection {C}. Without the NDIO message propagation, a node may take a longer path to reach the content host due to the unawareness of the content prefixes hosted by the upstream nodes. As the number of nodes in collection {C} increases, the more likely that a downstream node will take a longer path towards the content host. Accordingly, the larger the number of nodes, the greater the number of saved hops due to employing NDIO message propagation.

Figure 8D:
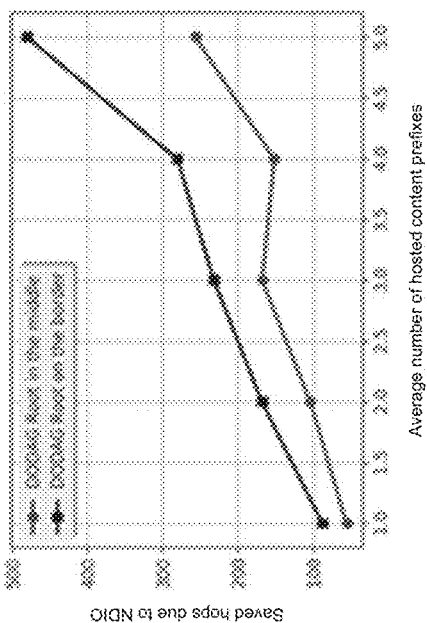

In FIGS. 8C and 8D, performance is evaluated by changing the average number of content prefixes hosted by the nodes in collection {C}. As the number of content prefixes hosted increases, the nodes in collection {C} collectively send a greater number of NDIO messages (and the nodes are targeted by interest messages more frequently). Thus, as shown in the figures, the overhead of NDIO messages increases with the number of hosted content prefixes. The number of saved hops due to the NDIO message propagation also increases along with the average number of hosted name prefixes as shown in FIG. 8D.

FIG. 8E shows the overhead in number of propagated NDAO message versus the average number of hosted content prefixes in each node. The overhead in number of propagated NDAO linearly increases along with the average number of hosted content prefixes. The deeper the DODAG, the more NDAO message overhead is generated. As an NDAO message is sent by every child node upstream until it reaches the root node, the total number of NDAO messages propagated in the DODAG is calculated in by the following equation:

$$OH_{NDAO} = \sum_{i \in \{DODAG\}} (Rank_i - Rank_{root}) * Size_{NDAO} * Cp_i \quad (2)$$

Figure 9:
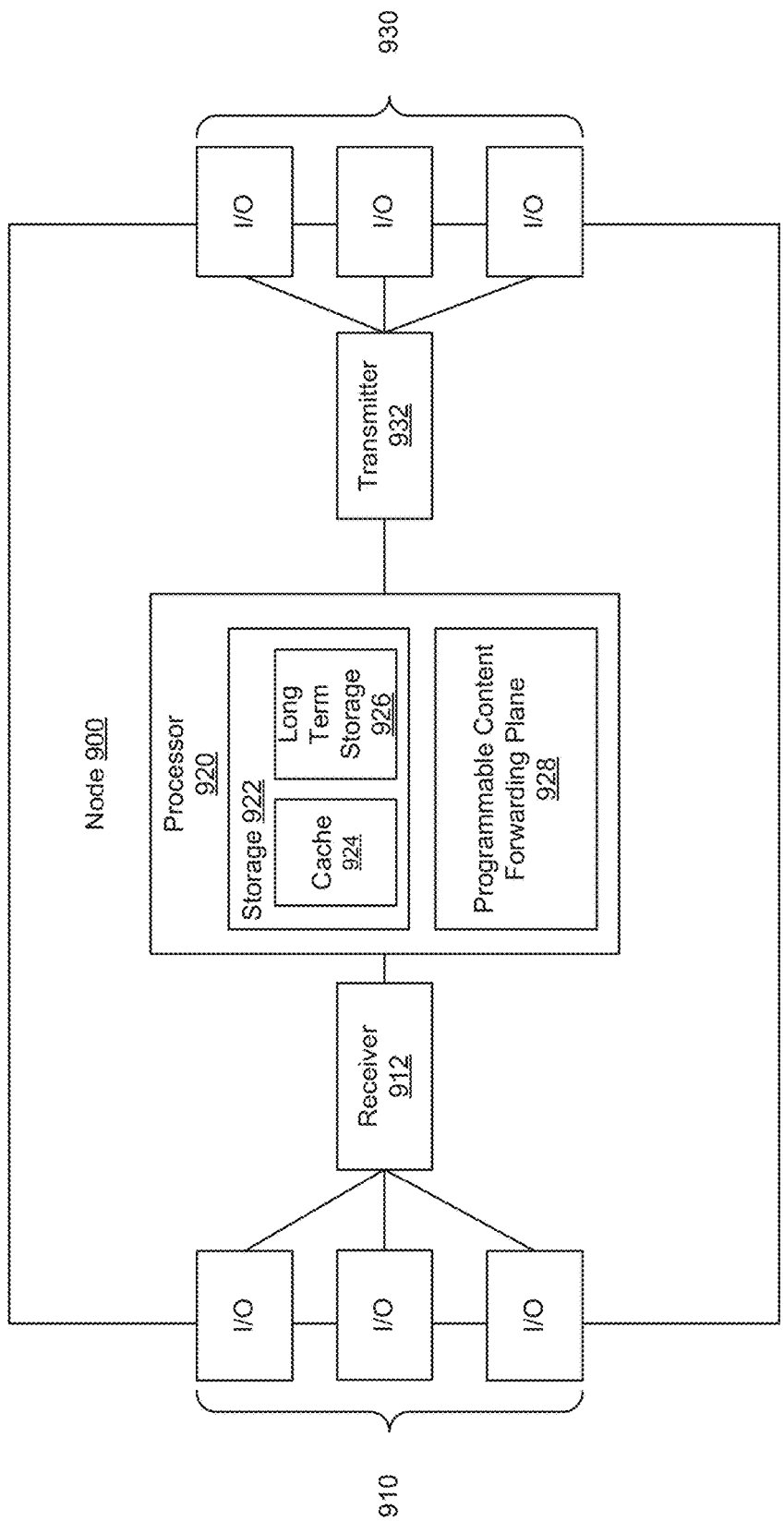
FIG. 9 illustrates an embodiment of a router in accordance with embodiments of the disclosure.

FIG. 9 illustrates an embodiment of a router in accordance with embodiments of the disclosure. The node (e.g., a router) 900 may be, for example, the content router 106 (FIG. 1) or any other node or router as described above in the ICN. The node 900 may comprise a plurality of input/output ports 910/930 and/or receivers (Rx) 912 and transmitters (Tx) 932 for receiving and transmitting data from other nodes, a processing system or processor 920 (or content aware unit), including a storage 922 and programmable content forwarding plane 928, to process data and determine which node to send the data. The node 900 may also receive Interest messages and Data messages as described above. Although illustrated as a single processor, the processor 920 is not so limited and may comprise multiple processors. The processor 920 may be implemented as one or more central processing unit (CPU) chips, cores (e.g., a multi-core processor), field-programmable gate arrays (FPGAs), application specific integrated circuits (ASICs), and/or digital signal processors (DSPs), and/or may be part of one or more ASICs. The processor 920 may be configured to implement any of the schemes described herein, such as the processes illustrated in FIG. 7E, using any one or combination of steps described in the embodiments. Moreover, the processor 920 may be implemented using hardware, software, or both.

The storage 922 (or memory) may include cache 924 and long-term storage 926, and may be configured to store routing tables, forwarding tables, or other tables or information disclosed herein. Although illustrated as a single storage, storage 922 may be implemented as a combination of read only memory (ROM), random access memory (RAM), or secondary storage (e.g., one or more disk drives or tape drives used for non-volatile storage of data).

The programmable content forwarding plane 928 may be configured to implement content forwarding and processing functions, such as at an application layer or L3, where the content may be forwarded based on content name or prefix and possibly other content related information that maps the content to network traffic. Such mapping information may be maintained in one or more content tables (e.g., CS, PIT, FIB) at the processor 920. The programmable content forwarding plane 928 may interpret user requests for content and accordingly fetch content, e.g., based on meta-data and/or content name (prefix), from the network or other content routers and may store the content, e.g., temporarily, in storage 922. The programmable content forwarding plane 928 may then forward the cached content to the user. The programmable content forwarding plane 928 may be implemented using software, hardware, or both and may operate above the IP layer or L2.

Figure 10:
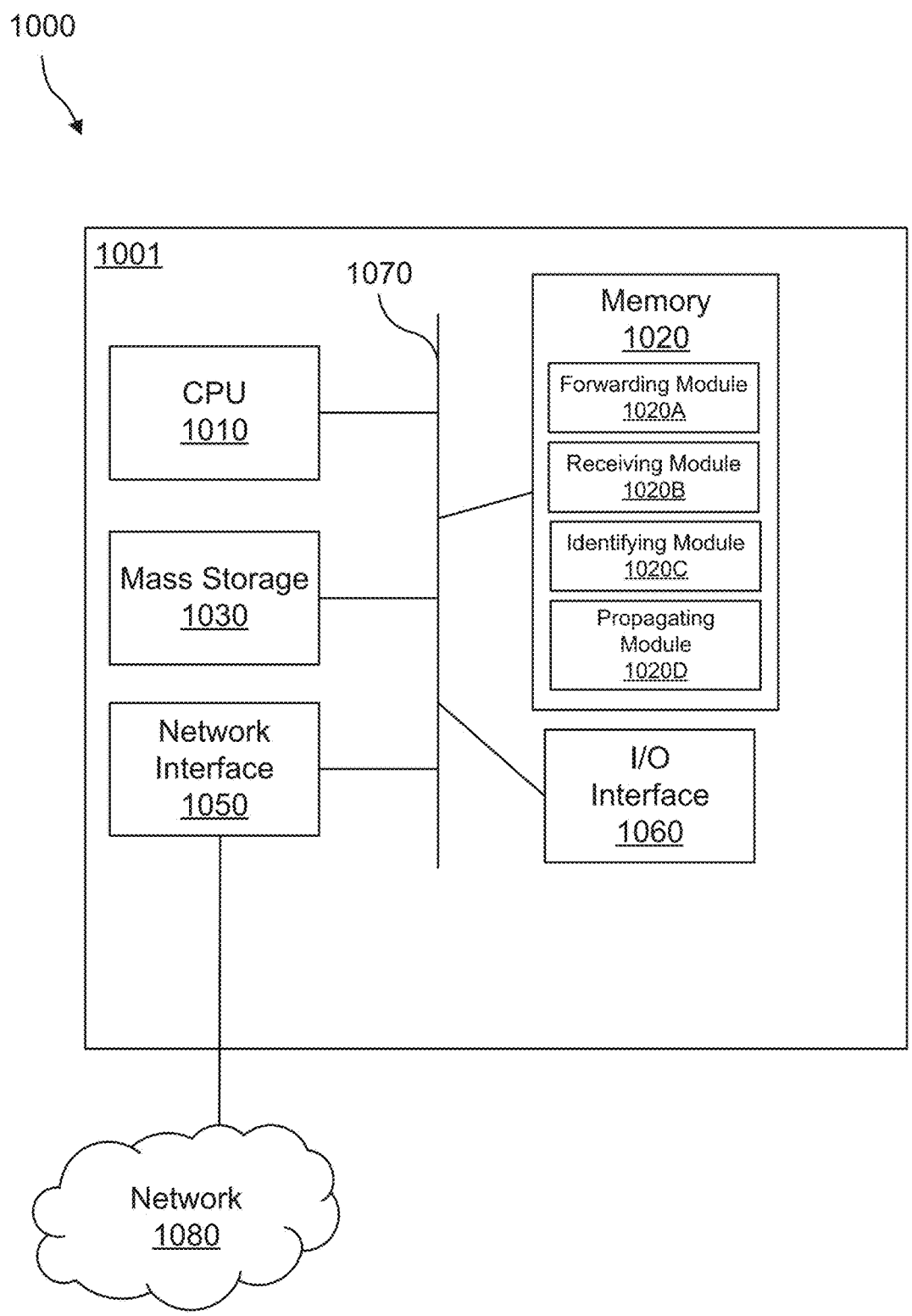
FIG. 10 illustrates a block diagram of a network system that can be used to implement various embodiments.

FIG. 10 is a block diagram of a network device that can be used to implement various embodiments. Specific network devices may utilize all of the components shown, or only a subset of the components, and levels of integration may vary from device to device. Furthermore, the network device 1000 may contain multiple instances of a component, such as multiple processing units, processors, memories, transmitters, receivers, etc. The network device 1000 may comprise a processing unit 1001 equipped with one or more input/output devices, such as network interfaces, storage interfaces, and the like. The processing unit 1001 may include a central processing unit (CPU) 1010, a memory 1020, a mass storage device 1030, and an I/O interface 1060 connected to a bus 1070. The bus 1070 may be one or more of any type of several bus architectures including a memory bus or memory controller, a peripheral bus or the like.

The CPU 1010 may comprise any type of electronic data processor. The memory 1020 may comprise any type of system memory such as static random access memory (SRAM), dynamic random access memory (DRAM), synchronous DRAM (SDRAM), read-only memory (ROM), a combination thereof, or the like. In an embodiment, the memory 1020 may include ROM for use at boot-up, and DRAM for program and data storage for use while executing programs. In embodiments, the memory 1020 is non-transitory. In one embodiment, the memory 1020 includes a forwarding module 1020A forwarding a downstream message including one or more name prefixes hosted at a source node along a nodal route of a routing topology, a receiving module 1020B receiving an upstream message from one or more nodes along one or more nodal routes in the routing topology based on a routing entry towards a parent node as learned from the downstream message and/or receiving an interest message, including one or more of a request for content or rank, from the one or more nodes along the one or more nodal routes having an optimal path, the optimal path determined by routing entries stored in the one or more nodes, an identifying module 1020C identifying the one or more nodes having a lowest rank and more than one direct parent node is identified in response to a neighboring node of the source node having a higher rank than a rank of the source node, and the rank of the one or more nodes requesting the content having a lower rank than the rank of the source node, and an propagating module 1020D propagating the downstream message to the one or more nodes having a lowest rank and more than one direct parent node and/or propagating the upstream message to a root node in the routing topology, the upstream message includes one or more name prefixes hosted by each of the one or more nodes.

The mass storage device 1030 may comprise any type of storage device configured to store data, programs, and other information and to make the data, programs, and other information accessible via the bus 1070. The mass storage device 1030 may comprise, for example, one or more of a solid state drive, hard disk drive, a magnetic disk drive, an optical disk drive, or the like.

The processing unit 1001 also includes one or more network interfaces 1050, which may comprise wired links, such as an Ethernet cable or the like, and/or wireless links to access nodes or one or more networks 1080. The network interface 1050 allows the processing unit 1001 to communicate with remote units via the networks 1080. For example, the network interface 1050 may provide wireless communication via one or more transmitters/transmit antennas and one or more receivers/receive antennas. In an embodiment, the processing unit 1001 is coupled to a local-area network or a wide-area network for data processing and communications with remote devices, such as other processing units, the Internet, remote storage facilities, or the like.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The computer-readable non-transitory media includes all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for distributing messages in a low power and lossy network (LLN), comprising:
   forwarding a downstream message including one or more name prefixes hosted at a source node along a nodal route of a routing topology;
   propagating the downstream message to the one or more nodes having a lowest rank and more than one direct parent node;
   receiving an upstream message from one or more nodes along one or more nodal routes in the routing topology based on a routing entry towards a parent node as learned from the downstream message;
   propagating the upstream message to a root node in the routing topology, wherein the upstream message includes one or more name prefixes hosted by each of the one or more nodes; and
   receiving an interest message, including one or more of a request for content or rank, from the one or more nodes along the one or more nodal routes having an optimal path, the optimal path determined by routing entries stored in the one or more nodes.

2. The method of claim 1, wherein the one or more nodes having a lowest rank and more than one direct parent node is identified in response to a neighboring node of the source node having a higher rank than a rank of the source node, and the rank of the one or more nodes requesting the content having a lower rank than the rank of the source node.

3. The method of claim 1, further comprising forwarding a probing message along the nodal route of the routing topology upon detecting that one or more nodes has more than one direct parent node, the probing message identifying an identifier and address of the one or more nodes and includes an identifier and address of a lowest ranking node.

4. The method of claim 1, wherein
   the downstream message is forwarded after the one or more nodes joins the routing topology, and
   the one or more nodes having the one direct parent node ignores the downstream message.

5. The method of claim 1, wherein each of the one or more name prefixes is associated with a valid or invalid tag indicating whether the one or more name prefixes are registered or deregistered in the source node.

6. The method of claim 5, wherein the valid tag indicates an expiration time may be set for a valid period.

7. The method of claim 1, wherein
   in a storing mode, each of the one or more nodes in the routing topology, except a leaf node, stores a list of routing entries of content such that a common parent node of the one or more nodes requesting the content and the source node forward the interest message without traversing a root node, and
   in a non-storing mode, a root node maintains a list of routing entries of content within the within the routing topology and the interest message is sent upstream until reaching the root node.

8. The method of claim 1, wherein the downstream message is a Name Destination Oriented Directed Acyclic Graph (DODAG) Information Object (NDIO) message including one or more of a flag field, a 'G' flag field, a rank field, a reserved field, a DODAG ID field and a name prefix option field.

9. The method of claim 1, wherein the upstream message is a Name Destination Advertisement Object (NDAO) message including one or more of a flag field, a 'K' flag field, and a name prefix option field.

10. A non-transitory computer-readable medium storing computer instructions distributing messages in a low power and lossy network (LLN), that when executed by one or more processors, perform the steps of:
    forwarding a downstream message including one or more name prefixes hosted at a source node along a nodal route of a routing topology;
    receiving an upstream message from one or more nodes along one or more nodal routes in the routing topology based on a routing entry towards a parent node as learned from the downstream message; and
    receiving an interest message, including one or more of a request for content or rank, from the one or more nodes along the one or more nodal routes having an optimal path, the optimal path determined by routing entries stored in the one or more nodes,
    wherein the one or more nodes having a lowest rank and more than one direct parent node is identified in response to a neighboring node of the source node having a higher rank than a rank of the source node, and the rank of the one or more nodes requesting the content having a lower rank than the rank of the source node.

11. The non-transitory computer-readable medium of claim 10, wherein the one or more processors further perform the steps of:
    propagating the downstream message to the one or more nodes having a lowest rank and more than one direct parent node, and
    propagating the upstream message to a root node in the routing topology, wherein the upstream message includes one or more name prefixes hosted by each of the one or more nodes.

12. The non-transitory computer-readable medium of claim 10, wherein the one or more processors further perform the steps of: forwarding a probing message along the nodal route of the routing topology upon detecting that one or more nodes has more than one direct parent node, the probing message identifying an identifier and address of the one or more nodes and includes an identifier and address of a lowest ranking node.

13. The non-transitory computer-readable medium of claim 10, wherein
    the downstream message is forwarded after the one or more nodes joins the routing topology, and
    the one or more nodes having the one direct parent node ignores the downstream message.

14. The non-transitory computer-readable medium of claim 10, wherein the downstream message is a Name Destination Oriented Directed Acyclic Graph (DODAG) Information Object (NDIO) message including one or more of a flag field, a 'G' flag field, a rank field, a reserved field, a DODAG ID field and a name prefix option field.

15. The non-transitory computer-readable medium of claim 10, wherein the upstream message is a Name Destination Advertisement Object (NDAO) message including one or more of a flag field, a 'K' flag field, and a name prefix option field.

16. A network device for distributing messages in a low power and lossy network (LLN), comprising:
    forwarding a downstream message including one or more name prefixes hosted at a source node along a nodal route of a routing topology;
    receiving an upstream message from one or more nodes along one or more nodal routes in the routing topology based on a routing entry towards a parent node as learned from the downstream message;
    receiving an interest message, including one or more of a request for content or rank, from the one or more nodes along the one or more nodal routes having an optimal path, the optimal path determined by routing entries stored in the one or more nodes; and
    forwarding a probing message along the nodal route of the routing topology upon detecting that one or more nodes has more than one direct parent node, the probing message identifying an identifier and address of the one or more nodes and includes an identifier and address of a lowest ranking node.

17. The network device of claim 16, further comprising:
    propagating the downstream message to the one or more nodes having a lowest rank and more than one direct parent node, and
    propagating the upstream message to a root node in the routing topology, wherein the upstream message includes one or more name prefixes hosted by each of the one or more nodes.

18. The network device of claim 16, wherein the one or more nodes having a lowest rank and more than one direct parent node is identified in response to a neighboring node of the source node having a higher rank than a rank of the source node, and the rank of the one or more nodes requesting the content having a lower rank than the rank of the source node.

* * * * *

UNITED STATES PATENT AND TRADEMARK OFFICE
CERTIFICATE OF CORRECTION

PATENT NO. : 10,530,685 B2
APPLICATION NO. : 15/925246
DATED : January 7, 2020
INVENTOR(S) : L. Dong Page 1 of 1

It is certified that error appears in the above-identified patent and that said Letters Patent is hereby corrected as shown below:

In the Claims

Column 19, Line 65 (Claim 7), please change "within the within the" to --within the--.

Signed and Sealed this
Eleventh Day of August, 2020

Andrei Iancu
*Director of the United States Patent and Trademark Office*